UNITED STATES PATENT OFFICE.

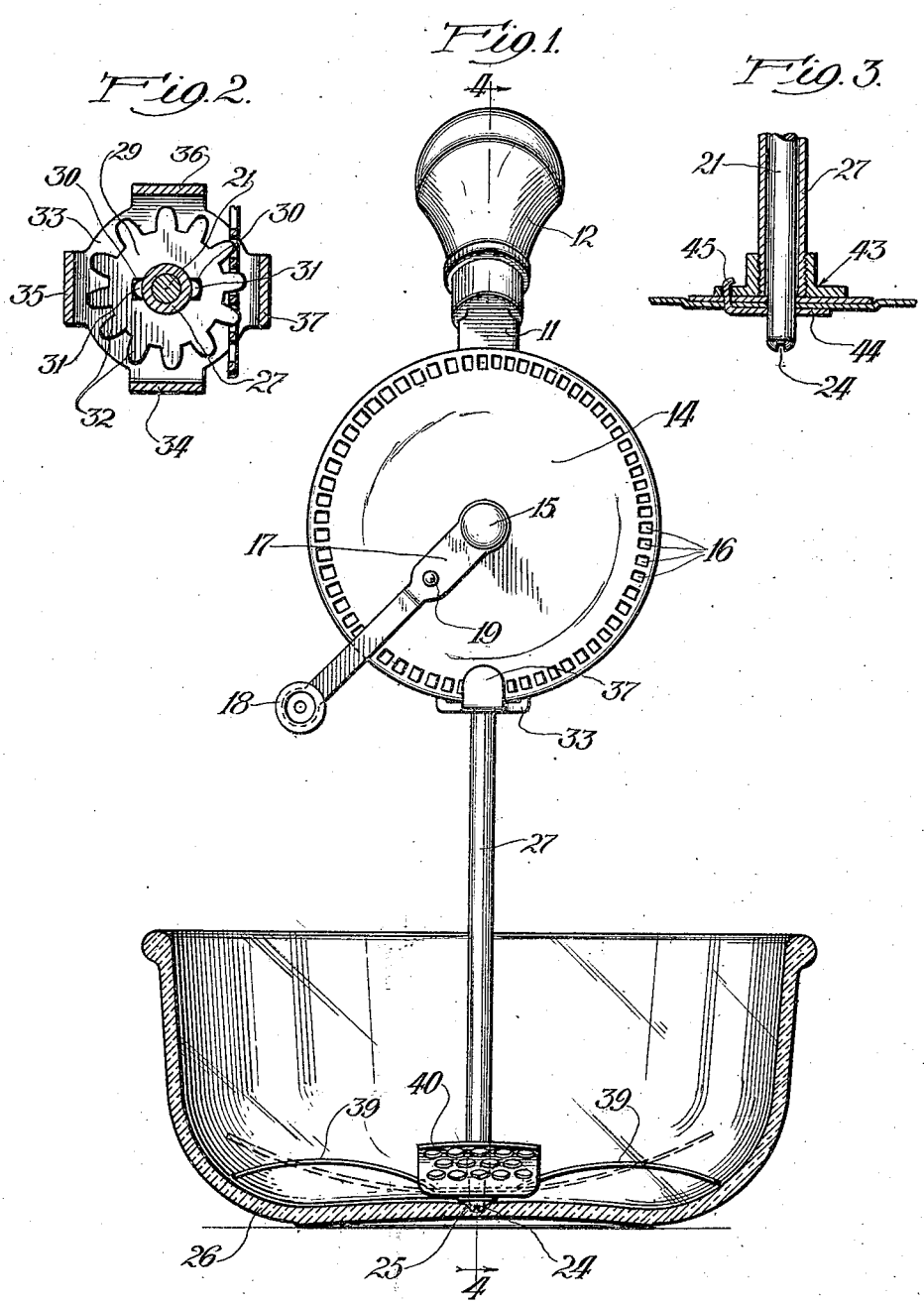

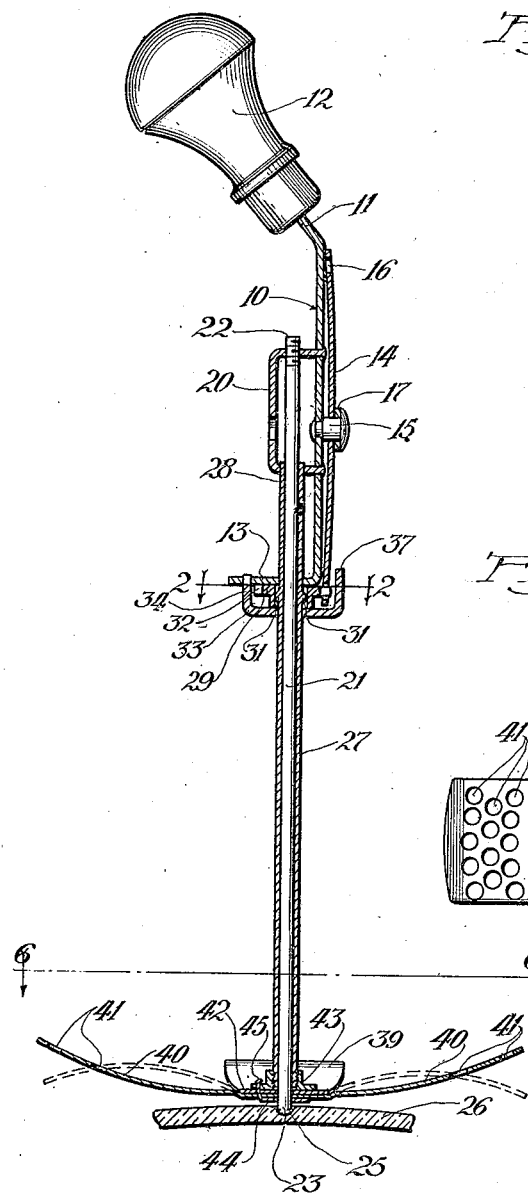

EDWARD E. HOLT, OF CHICAGO, ILLINOIS.

CREAM WHIP AND THE LIKE.

1,426,080.          Specification of Letters Patent.      Patented Aug. 15, 1922.

Application filed January 11, 1922. Serial No. 528,401.

*To all whom it may concern:*

Be it known that I, EDWARD E. HOLT, a citizen of the United States, residing at Chicago, in the county of Cook and State of Illinois, have invented certain new and useful Improvements in Cream Whips and the like, of which the following is a specification.

This invention has to do with certain improvements in cream whips and like devices. Cream whips are used for whipping cream and other liquids in the well understood manner.

One of the objects of the present invention is to provide an improved construction of cream whip and one which may be made of very substantial and permanent construction at low cost. In this connection another object is to provide a construction of cream whip which can be easily made from metal stampings and other parts which are cheaply manufactured in quantities.

Another feature of the invention relates to the manner in which the cream whip is supported within the bowl containing the cream or other liquid. The paddle or other whipping element must rotate with respect to the liquid within the bowl. At the same time a suitable support must be provided for sustaining the device on the floor of the bowl. In previous constructions with which I am familiar, the rotatable element, either the paddle itself or the stem connected thereto, has been supported directly on the floor of the bowl, so that relative rotation has existed as between these parts. As a result it has frequently occurred in the past that small particles of the material of the bowl have broken off into the liquid within the bowl, with the resulting detrimental effect on the liquid and danger to those consuming the same.

Another object of the invention is to provide a cream whip of such construction that the lower end thereof which is adapted to engage the bowl and be supported thereby is non-rotatable, so that relative rotation does not exist as between the bowl and the element of the cream whip in direct contact therewith.

Another object of the invention is to provide a greatly improved form and construction of whipping paddle. In this connection an object is to provide a paddle of such construction that the blades thereof will cut through the cream or other liquid at different points and in succession, so as to correspondingly improve the whipping action.

Another object in this connection is to provide a paddle element which is self-contained, and which can be readily attached to or removed from the shaft, so that this paddle element may be easily removed as a unit in order to reduce the size of the cream whip for purposes of packing and shipment.

Another feature of the invention relates to the provision of a cream whip of such construction that certain parts may be readily disassembled or taken apart in order to facilitate cleaning and sterilizing them.

Other objects and uses of the invention will appear from a detailed description of the same which consists in the features of construction and combinations of parts hereinafter described and claimed.

Referring to the drawings:

Figure 1 shows a face view of a cream whip embodying the features of the present invention, as the same may be set into place on the floor of the bowl, the bowl itself being shown in cross section;

Fig. 2 shows a fragmentary detail section on enlarged scale taken on the line 2—2 of Fig. 4, looking in the direction of the arrows;

Fig. 3 shows a fragmentary detail section on enlarged scale through the lower portion of the pin and shaft and through the central portion of the paddle element, being a fragmentary section of the lower portion of line 4—4 of Fig. 1, looking in the direction of the arrows;

Fig. 4 shows a section taken on the line 4—4 of Fig. 1, looking in the direction of the arrows;

Fig. 5 shows a fragmentary face view of the gear wheel and associated parts of Fig. 1, a portion of the bracket being broken away so as to show the manner of attachment of the guard thereto; and Fig. 6 shows a section taken on the line 6—6 of Fig. 4, looking in the direction of the arrows.

The cream whip shown in the drawings includes a handle member 10 whose form is best shown in Fig. 4. The upper portion 11 of this handle member is bent rearwardly at an angle of substantially 45°, and the hand grip 12 is mounted on its upper end. The lower end 13 of the handle member 10 is bent over at right angles, as shown in Fig. 4. A gear wheel 14 is centrally journaled on the handle member 10 by means of a pin 15. This pin consists of a rivet extended through the handle member and riveted solid against the same, the outer end of the rivet being provided with an enlarged head so as to retain the gear wheel 14 in place. The gear wheel itself is provided with a series of peripheral toothed openings 16, as clearly shown in Figs. 1 and 5. The handle 17 is secured to the front face of the gear wheel, said handle having its inner end lying flush against the face of the gear wheel, and its outer end deflected away from the gear wheel and provided with the grip 18. The inner end portion of the handle 17 is secured to the gear wheel by means of the rivet pin 15 and a supplementary rivet 19 as clearly shown in Fig. 1.

To the back face of the handle member 10 is secured a bracket member 20. This bracket member is of generally U-shape, as shown in Fig. 4, its arms being passed through the handle member 10, and being upset, as shown in Fig. 4. A supporting rod 21 has its upper portion extended through the upper and lower arms of the member 20, the upper end 22 of the rod 21 being threaded into the upper arm of the U member 20. The lower end 23 of this rod may be provided with a transverse slot 24 by means of which it may be conveniently turned by a screw driver or other tool. The lower end of the rod 21 is adapted to seat into a socket 25 in the floor 26 of the bowl within which the cream is used. Owing to the fact that the rod 21 does not rotate, it will be seen that the cream whip itself is supported on the floor of the bowl by a non-rotatable support.

A sleeve shaft 27 surrounds the rod 21. The upper end 28 of said sleeve shaft is journaled in the lower arm of the U member 20. The central portion of said sleeve shaft 27 carries a drive pinion 29 by means of which it is driven from the gear wheel 14. This drive pinion and its connection to the sleeve shaft 27 are clearly shown in Fig. 2. The drive pinion is provided with a pair of oppositely disposed notches 30 into which enter the lugs 31 of the sleeve shaft. These lugs are formed by pinching the metal of the sleeve shaft in the well understood manner. The teeth 32 of the drive pinion project outwardly a sufficient distance to be engaged by the perforations 16 of the gear wheel 14.

A bracket member 33 serves to retain the pinion and sleeve shaft in the proper operative position with respect to the handle member 10. This bracket member 33 is of quadrilateral form, as is clearly illustrated in Fig. 2, having the upstanding lugs 34, 35 and 36 which are secured to the lower end portion 13 of the handle member 10, and having an upstanding guard finger 37 on its front side. This guard finger 37 overlies the lower edge portion of the gear wheel 14 at the point where the teeth of the pinion mesh with its perforations so as to retain the parts in proper mesh and prevent the gear wheel from deflecting sidewise away from said teeth. The guard member 33 retains the drive pinion 29 in position and said pinion cannot fall away from the handle member 10 on account of the presence of the guard member; and the guard member retains the drive shaft 27 in place by the presence of the lugs 31 on the drive shaft.

The guard member 33 may be secured to the lower end portion 13 of the handle member 10 in any suitable manner, but the arrangement illustrated in detail in Fig. 5 will be found a very convenient one. As shown in this figure, the lugs 34, 35 and 36 of the guard member are provided with upstanding projections 38 of reduced size which pass through holes in the lower end 13 of the handle member, and are then upset by a convenient operation.

The paddle member illustrated in the drawing includes the right angle pairs of wings 39 and 40. The central portions of these pairs are flat and are set squarely together. The end portions of the wings 39 are curved in such a manner that they are concave downwardly, whereas the end portions of the wings 40 are curved in such a manner that they are concave upwardly. Furthermore, the wings 40 are provided with perforations 41 in their end portions so as to still further accentuate the whipping action. The wings 39 and 40 are preferably made of relatively flexible material, such as thin steel or the like, but I do not limit the invention to use in connection with wings of this character.

The central portions 42 of the wings are joined together in the manner shown in detail in Figs. 3 and 6. This construction includes an internally threaded neck 43 located on the top face of the paddle member, in conjunction with a washer 44 located against the bottom face of the paddle member. The washer 44 is provided with a series of prongs 45 which extend upwardly through perforations in the paddle members 39 and 40 and perforations 46 of the neck member 43. These prongs 45 are folded or riveted over in the manner shown in detail in Fig. 3, so as to rivet the paddle members securely together. The neck 43 is internally threaded, as shown in Fig. 3, so that it can be readily attached to or detached from the lower end of the hollow shaft 27.

While I have herein shown and described only a single embodiment of the features of my invention, still I do not limit myself to the same, except as I may do so in the claims.

I claim:

1. As a new article of manufacture, a paddle for a cream whip, comprising in combination a pair of blade members located at right angles to each other, said blade members comprising strips of relatively thin and broad spring-like metal, the central crosswise portions of said strips being flat and lying in direct contact, and the arms of one strip being curved in such a manner as to be concave upwardly, and the arms of the other strip being curved in such a manner as to be concave downwardly, the paths of travel of said arms intersecting each other during rotation, a hub member in contact with the central portion of the top face of the top member, and a locking sleeve in contact with the central portion of the bottom face of the bottom member, and having prongs extending through both members into locking engagement with the hub member aforesaid, substantially as described.

2. As a new article of manufacture, a paddle for a cream whip, comprising in combination a pair of blade members located at right angles to each other, said blade members comprising strips of relatively thin and broad springlike metal, the central crosswise portions of said strips being flat and lying in direct contact, and the arms of one strip being curved in such a manner as to be concave upwardly, and the arms of the other strip being curved in such a manner as to be concave downwardly, the paths of travel of said arms intersecting each other during rotation, and a suitable hub member in conjunction with the central portions of both of said strips, substantially as described.

3. In a cream whip and the like the combination of a handle member, a hollow shaft journaled with respect thereto, a paddle member on the lower end of said hollow shaft, means for rotating the hollow shaft, and a stationary bearing rod extending through the hollow shaft and having its upper end stationary with respect to the handle member and its lower end projecting below the position of the paddle member, whereby said projecting portion is available for engagement with the floor of a bowl or the like without rotation, the paddle member and hollow shaft rotating freely with respect thereto, substantially as described.

4. In a cream whip and the like the combination of a handle member, a shaft journaled with respect thereto, a paddle member on the lower end of said shaft, means for rotating the shaft, and a stationary bearing member rigid with respect to the handle member and projecting below the position of the paddle member, and available for direct engagement with the floor of a bowl or the like without rotation, whereby the paddle member and shaft are free to rotate, and whereby the downward pressure on the cream whip is directly transmitted to the floor of the bowl or other container without interposition of a rotating support, substantially as described.

EDWARD E. HOLT.